(12) United States Patent
Broos et al.

(10) Patent No.: US 8,402,370 B2
(45) Date of Patent: Mar. 19, 2013

(54) SYSTEM FOR STORING AND PROVIDING INFORMATION FOR PERSONALIZING USER DEVICES

(75) Inventors: Rudi Constantinus Josephina Broos, Essen (BE); Mingwen Wang, Mortsel (BE)

(73) Assignee: Alcatel Lucent, Paris (FR)

( * ) Notice: Subject to any disclaimer, the term of this patent is extended or adjusted under 35 U.S.C. 154(b) by 715 days.

(21) Appl. No.: 11/567,706

(22) Filed: Dec. 6, 2006

(65) Prior Publication Data
US 2007/0136670 A1  Jun. 14, 2007

(30) Foreign Application Priority Data
Dec. 9, 2005  (EP) ..................................... 05292664

(51) Int. Cl.
G06F 17/30 (2006.01)
(52) U.S. Cl. ....................................................... 715/255
(58) Field of Classification Search .................... 715/255
See application file for complete search history.

(56) References Cited

U.S. PATENT DOCUMENTS

| | | | | |
|---|---|---|---|---|
| 2003/0156134 A1* | 8/2003 | Kim | ............................... | 345/753 |
| 2005/0264647 A1* | 12/2005 | Rzeszewski et al. | ....... | 348/14.02 |
| 2006/0080415 A1* | 4/2006 | Tu | ................................ | 709/220 |
| 2006/0251060 A1* | 11/2006 | Iwakawa et al. | .............. | 370/360 |
| 2006/0277473 A1* | 12/2006 | Levine et al. | .................. | 715/744 |
| 2006/0285663 A1* | 12/2006 | Rathus et al. | .............. | 379/88.22 |

\* cited by examiner

Primary Examiner — Laurie Ries
Assistant Examiner — Tionna Smith
(74) Attorney, Agent, or Firm — Fay Sharpe LLP

(57) ABSTRACT

Systems (10) for storing and providing information for personalizing user devices (61-64, 71-72) comprise first means (11) for storing personalization information destined for user devices (61-64) of a predefined type and comprise second means (12) for providing the personalization information to these user devices (61-64) and are provided with third means (13) for storing further personalization information destined for further user devices (71-72) of a further predefined type and with fourth means (14) for providing the further personalization information to these further user devices (71-72), to handle different user devices (61-64, 71-72) of different predefined types. Preferably, the systems (10) comprise fifth means (15) for billing one and the same user for provisions of the personalization information and for further provisions of the further personalization information, which one and the same user owns the user devices (61-64, 71-72). User devices (61-64, 71-72) comprise mobile phones, televisions, set top boxes, monitors, pc's, cordless phones and fixed phones. Personalization information comprises avatars, pictures, logos, sound and speech.

23 Claims, 3 Drawing Sheets

SYSTEM FOR STORING AND PROVIDING INFORMATION FOR PERSONALIZING USER DEVICES

Figure 1:
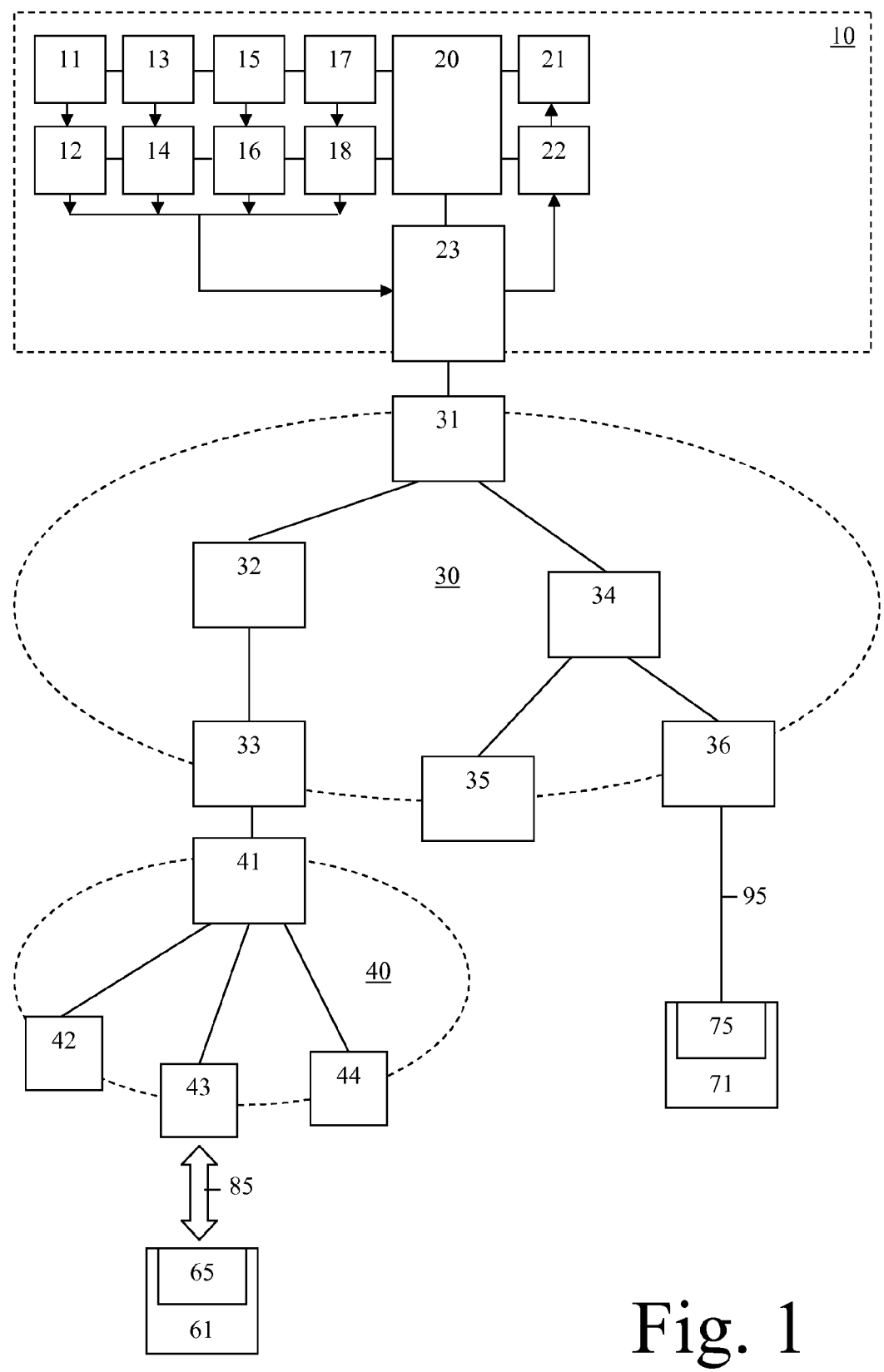

The invention relates to a system for storing and providing information for personalizing user devices, which system comprises first means for storing personalization information destined for a user device of a predefined type and comprises second means for providing the personalization information to the user device of the predefined type.

Examples of such personalization information are avatars and/or pictures and/or logos and/or sound and/or speech and examples of such user devices are mobile phones and televisions and set top boxes and monitors and personal computers and cordless phones and fixed phones.

A prior art system is of common general knowledge. The first means for storing personalization information for example comprise a server or a database. The second means for providing the personalization information for example comprise an interface or a modem.

US App 2002/0143622 A1 discloses a method for licensing three-dimensional avatars and shows that it is becoming more and more interesting to license personalization information.

The known system is disadvantageous, inter alia, owing to the fact that it serves its users to a relatively small extent.

It is an object of the invention, inter alia, to provide a system as defined above that serves its users to a relatively large extent.

The system according to the invention is characterized in that the system comprises third means for storing further personalization information destined for a further user device of a further predefined type and comprises fourth means for providing the further personalization information to the further user device of the further predefined type, the user devices being different user devices and the predefined types being different predefined types.

By introducing the third means such as for example a server or a database and by introducing the fourth means such as for example an interface or a modem, one and the same system can handle different user devices of different predefined types and can provide the personalization information to different user devices of different predefined types such as a mobile phone and a television or such as a set top box and a cordless phone or such as a personal computer with a monitor and a fixed phone etc. The personalization information and the further personalization information are preferably designed to personalize different user devices in a mutually dependent way. In other words, the personalization information and the further personalization information are preferably related to a same subject or a same theme.

The system according to the invention is further advantageous, inter alia, in that it improves the efficiency of the providing of personalization information.

The first and third means may be different means or may partly or entirely comprise mutual means and the second and fourth means may be different means or may partly or entirely comprise further mutual means. The providing may comprise any kind of provision, such as supplying (further) personalization information to a (further) user device in response to a request from a user or not as well as offering a link to a (further) user device in response to a request from a user or not via which link the (further) user device can collect the (further) personalization information.

An embodiment of the system according to the invention is characterized in that the user device of the predefined type comprises a transceiver for transceiving signals via a communication channel and in that the further user device of the further predefined type comprises a further transceiver for transceiving further signals via a further communication channel, the communication channels being different kinds of communication channels.

Especially for different user devices using different communication channels, the system according to the invention will serve its users to an even larger extent.

An embodiment of the system according to the invention is characterized in that the system comprises fifth means for billing one and the same user for a provision of the personalization information and for a further provision of the further personalization information, which one and the same user owns both user devices.

Especially for one and the same user owning the user device as well as the further user device, the efficiency of the provision and of the further provision is improved even more.

An embodiment of the system according to the invention is characterized in that a user device of a first predefined type comprises a mobile phone and/or a user device of a second predefined type comprises a television and/or a set top box and/or a user device of a third predefined type comprises a monitor and/or a pc and/or a user device of a fourth predefined type comprises a cordless phone or a fixed phone.

An embodiment of the system according to the invention is characterized in that the personalization information and the further personalization information each comprise avatars and/or pictures and/or logos and/or sound and/or speech.

The invention also relates to third and/or fourth means for use in the system according to the invention.

The invention also relates to fifth means for use in the system according to the invention.

The invention also relates to a method for storing and providing information for personalizing user devices, which method comprises a first method step of storing personalization information destined for a user device of a predefined type and comprises a second method step of providing the personalization information to the user device of the predefined type, which method according to the invention is characterized in that the method comprises a third method step of storing further personalization information destined for a further user device of a further predefined type and comprises a fourth method step of providing the further personalization information to the further user device of the further predefined type, the user devices being different user devices and the predefined types being different predefined types.

The invention also relates to a computer program product for performing the method steps of the method according to the invention.

The invention also relates to a medium comprising the computer program product according to the invention.

Embodiments of the method according to the invention and of the computer program product according to the invention and of the medium according to the invention correspond with the embodiments of the system according to the invention.

The invention is based upon an insight, inter alia, that known systems only handle personalization information destined for a user device of a predefined type and only provide the personalization information to the user device of the predefined type. The invention is based upon a basic idea, inter alia, that the system should handle personalization information and further personalization information destined for different user devices of different predefined types and should provide the personalization information and the further personalization information to the different user devices of the different predefined types.

The invention solves the problem, inter alia, to provide a system that serves its users to a relatively large extent. The system according to the invention is further advantageous, inter alia, in that it improves the efficiency of the providing of the personalization information and the further personalization information.

These and other aspects of the invention will be apparent from and elucidated with reference to the embodiments(s) described hereinafter.

Figure 2:
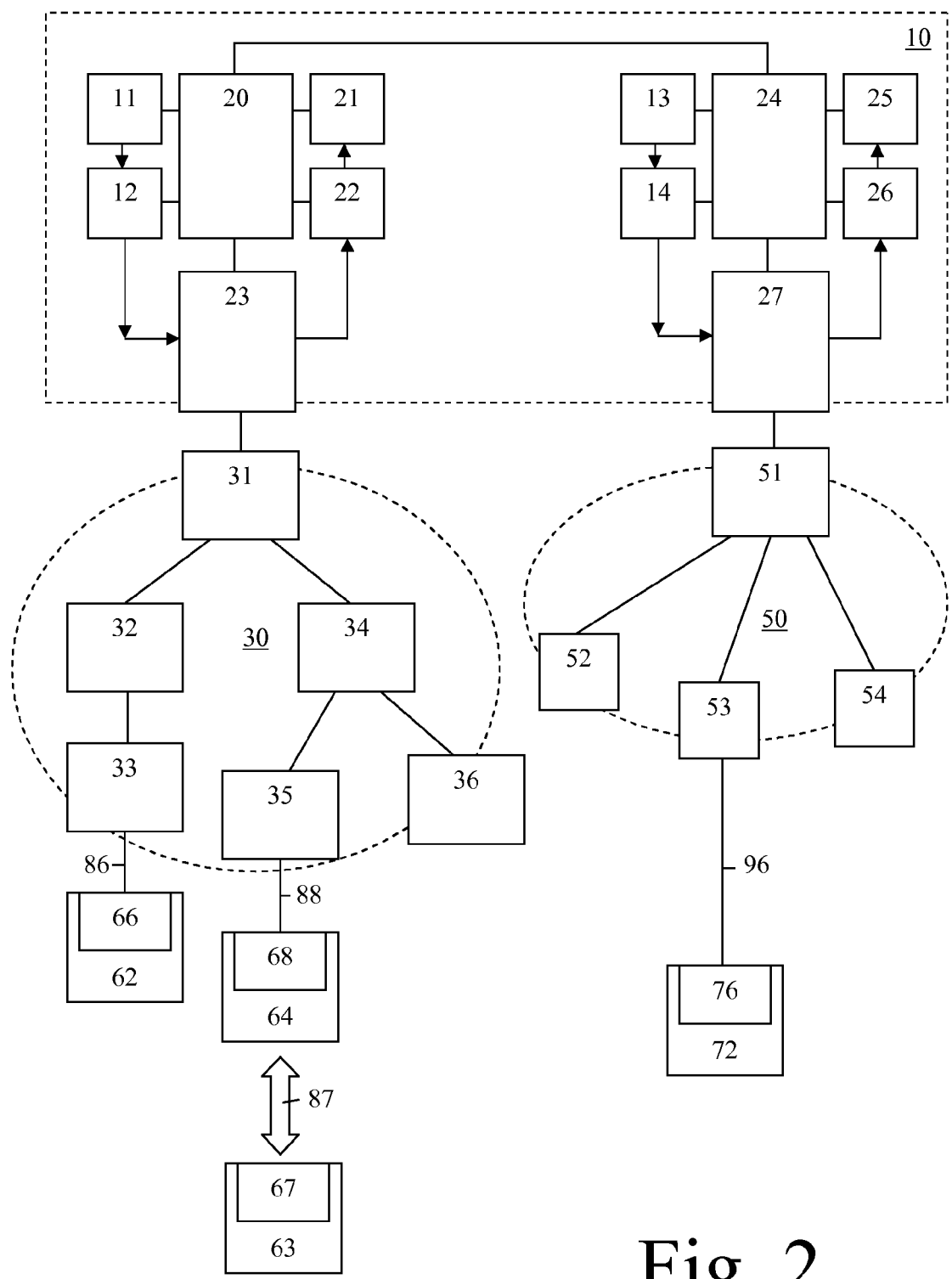

FIG. 1 shows diagrammatically a system according to the invention coupled to user devices via networks, FIG. 2 shows diagrammatically a system according to the invention coupled to user devices via networks, and FIG. 3 shows different user devices that have been personalized with different personalization information but related to a same subject.

The system 10 according to the invention shown in FIG. 1 comprises a processor 20 coupled to first means 11 for storing personalization information destined for a user device 61 of a predefined type and coupled to second means 12 for providing the personalization information to the user device 61 of the predefined type and coupled to third means 13 for storing further personalization information destined for a further user device 71 of a further predefined type and coupled to fourth means 14 for providing the further personalization information to the further user device 71 of the further predefined type and coupled to fifth means 21 for billing a user such as for example one and the same user for a provision of the personalization information and for a further provision of the further personalization information. The first means 11 and the third means 13 for example each comprise a memory or a database or a server or for example form part of a memory or a database or a server. The second means 12 and the fourth means 14 for example each comprise a transmitter or a generator or a supplier or for example form part of a transmitter or a generator or a supplier. The first means 11 are further coupled to the second means 12 and the third means 13 are further coupled to the fourth means 14.

The processor 20 is further coupled to sixth means 22 that for example comprise a receiver or a detector and that are further coupled to the fifth means 21. The processor 20 is also coupled to a network interface 23 that is further coupled to the means 12 and 14 and 22 and to a network unit 31 of a network 30. The system 10 according to the invention may further comprise seventh and/or ninth means 15 and 17 and eighth and/or tenth means 16 and 18 in correspondence with the means 11 and/or 13 and the means 12 and/or 14.

The network 30 further comprises a network unit 33 coupled via a network unit 32 to the network unit 31 and comprises network units 35 and 36 coupled via a network unit 34 to the network unit 31. The network unit 36 is coupled via a communication channel 95 to a user device 71 comprising a transceiver 75, and the network unit 33 is coupled to a network unit 41 of a network 40 further comprising base stations 42-44 all coupled to the network unit 41. The base station 43 communicates via a communication channel 85 to a user device 61 comprising a transceiver 65. The network 30 for example comprises or forms part of a telephone network, with the user device 71 for example comprising or forming part of a personal computer for internet communication via the network 30, and the network 40 for example comprises or forms part of a mobile network, with the user device 61 for example comprising or forming part of a mobile phone.

In a prior art situation, a user owning the user device 61 and being interested in personalizing his user device 61 with for example a sunny wallpaper or a sunny ring tone had to contact a wall paper provider or a ring tone provider that provides personalization information for this particular user device 61 (mobile phone). The same user or a different but for example related user owning the user device 71 and being interested in personalizing his user device 71 with for example a sunny wallpaper or a sunny computer melody had to contact a wall paper provider or a ring tone provider that provides personalization information for that particular user device 71 (pc). In that case, two different providers use two different systems, one of these systems for example comprising the means 11 and 12 and the other one for example comprising the means 13 and 14.

To increase the service to the users, the system 10 according to the invention comprises the means 11-14. A user owning the user device 61 contacts the system 10 in a way common in the art by for example sending an ordering signal via the networks 40 and 30 and via the interface 23 to the means 22 and the processor 20 and is thereby billed via the means 21. Such an ordering signal for example results from the dialling of a phone number and/or from the entering of one or more codes and/or from device internal and/or network internal information. As a result, personalization information stored in the means 11 is ordered. This personalization information is provided via the means 12 and the interface 23 and the networks 30 and 40 in a way common in the art by for example sending a personalization signal via the interface 23 and the networks 30 and 40 to the user device 61. As a result, the user device 61 is personalized with the personalization information.

The invention differs from the prior art in that, in addition, in the system 10 an indication is available (for example stored in a processor memory not shown) for indicating for example the user of the user device 61 and/or the user device 61 and/or the further user device 71 and/or a relationship between two or more of these indications. Such an indication may originate from the user and/or from the user device 61 and/or from a retriever for retrieving such indications. As a result, two options are possible.

According to a first option, in the system 10, via the means 13 comprising the further personalization information and the means 14, the further personalization information is provided via the interface 23 and the network 30 to the further user device 71 or the further personalization information is provided via the interface 23 to the network 30 and the network 30 temporarily stores it and contacts the further user device 71 for downloading this further personalization information into the further user device 71. As a result, after a user of the user device 61 has ordered the personalization information for the user device 61, the further personalization information is pushed towards the further user device 71. The user is for example billed only once for all personalization information together or is for example billed per personalization information. The user for example owns both user devices 61 and 71 or another user owns the further user device 71 whereby for example a relationship exists between both users. According to this first option, the system 10 must have knowledge about the further user device 71 or must be informed about this further user device 71.

According to a second option, in the system 10, via the means 13 comprising the further personalization information and the means 14, a link to the further personalization information is provided via the interface 23 and the network 30 to either the user device 61 or to the further user device 71. As a result, the user of the user device 61 may go to the further user device 71 and then order the further personalization information via the link as supplied to the user device 61, by for example sending a link signal via the network 30 and via the interface 23 to the means 22 and the processor 20. Such a link signal for example results from the dialing of a phone number and/or from the entering of one or more codes and/or from device internal and/or network internal information and may be generated by the user and/or via a connection between both user devices 61 and 71. Or the user or another user may order the further personalization information via the link as supplied to the further user device 71, by for example sending a link signal via the network 30 and via the interface 23 to the means 22 and the processor 20. Such a link signal for example results from the dialing of a phone number and/or from the entering of one or more codes and/or from device internal and/or network internal information and may be generated by the user or the other user. As a result, the further personalization information is pulled towards the further user device 71. The user is for example billed only once for all personalization information together or is for example billed per personalization information. The user for example owns both user devices 61 and 71 or the other user owns the further user device 71 whereby for example a relationship exists between both users. According to this second option, the system 10 only needs to have knowledge about the further user device 71 in case the link is to be sent to this further user device 71, otherwise not.

This way, the user device 61 (mobile phone) and the further user device 71 (pc) are both provided and personalized with for example mutually dependent and/or related personalization information, such as personalization information related to a same subject or a same theme such as for example the sun (a sunny wallpaper and/or a sunny ring tone for the mobile phone and a sunny wallpaper and/or a sunny computer melody for the pc). Preferably, one and the same user will own both user devices 61 and 71.

The system 10 according to the invention shown in FIG. 2 comprises a processor 20 coupled to first means 11 for storing personalization information destined for a user device 62-64 of a predefined type and coupled to second means 12 for providing the personalization information to the user device 62-64 of the predefined type and coupled to fifth means 21 for billing a user for a provision of the personalization information. The first means 11 are further coupled to the second means 12. The processor 20 is further coupled to sixth means 22 that for example comprise a receiver or a detector and that are further coupled to the fifth means 21. The processor 20 is also coupled to a network interface 23 that is further coupled to the means 12 and 22 and to a network unit 31 of a network 30.

The system 10 according to the invention shown in FIG. 2 further comprises a processor 24 coupled to third means 13 for storing further personalization information destined for a further user device 72 of a further predefined type and coupled to fourth means 14 for providing the further personalization information to the further user device 72 of the further predefined type and coupled to further fifth means 25 for billing a user for a provision of the further personalization information. The third means 13 are further coupled to the fourth means 14. The processor 24 is further coupled to further sixth means 26 that for example comprise a receiver or a detector and that are further coupled to the further fifth means 25. The processor 24 is also coupled to a network interface 27 that is further coupled to the means 14 and 26 and to a network unit 51 of a network 50. The processors 20 and 24 are further coupled to each other.

The network 30 further comprises a network unit 33 coupled via a network unit 32 to the network unit 31 and comprises network units 35 and 36 coupled via a network unit 34 to the network unit 31. The network unit 33 is coupled via a communication channel 86 to a user device 62 comprising a transceiver 66, and the network unit 35 is coupled via a communication channel 88 to a user device 64 comprising a transceiver 68, which user device 64 is coupled via a communication channel 87 to a user device 63 comprising a transceiver 67.

The network 50 further comprises cable stations 52-54 coupled to the network unit 51. The cable station 53 is coupled via a communication channel 96 to a further user device 72 comprising a transceiver 76. The network 30 for example comprises or forms part of a telephone network, with the user device 62 for example comprising or forming part of a fixed phone and with the user devices 63-64 for example comprising or forming part of a cordless telephone set, and the network 50 for example comprises or forms part of a cable network, with the further user device 72 for example comprising or forming part of a television or a set top box.

To increase the service to the users, the system 10 according to the invention comprises the means 11-14, compared to FIG. 1 not in a concentrated way but in a distributed way. A user owning the user device 62 (or 63-64) contacts the system 10 in a way common in the art by for example sending an ordering signal via the network 30 and via the interface 23 to the means 22 and the processor 20 and is thereby billed via the means 21. Such an ordering signal for example results from the dialing of a phone number and/or from the entering of one or more codes and/or from device internal and/or network internal information. As a result, personalization information stored in the means 11 is ordered. This personalization information is provided via the means 12 and the interface 23 and the network 30 in a way common in the art by for example sending a personalization signal via the interface 23 and the network 30 to the user device 62 (and/or 63-64). As a result, the user device 62 (and/or 63-64) is personalized with the personalization information.

The invention differs from the prior art in that, in addition, in the system 10 an indication is available (for example stored in a processor memory not shown) for indicating for example the user of the user device 62 (and/or 63-64) and/or the user device 62 (and/or 63-64) and/or the further user device 72 and/or a relationship between two or more of these indications. Such an indication may originate from the user and/or from the user device 62 (and/or 63-64) and/or from a retriever for retrieving such indications. As a result, two options are possible.

According to a first option, in the system 10, via the means 13 comprising the further personalization information and the means 14, the further personalization information is provided via the interface 27 and the network 50 to the further user device 72 or the further personalization information is provided via the interface 27 to the network 50 and the network 50 temporarily stores it and contacts the further user device 72 for downloading this further personalization information into the further user device 72. As a result, after a user of the user device 62 (and/or 63-64) has ordered the personalization information for the user device 62 (and/or 63-64), the further personalization information is pushed towards the further user device 72. The user is for example billed only once for all personalization information together or is for example billed per personalization information. The user for example owns both user devices 62 (and/or 63-64) and 72 or another user owns the further user device 72 whereby for example a relationship exists between both users. According to this first option, the system 10 must have knowledge about the further user device 72 or must be informed about this further user device 72.

According to a second option, in the system 10, via the means 13 comprising the further personalization information and the means 14, a link to the further personalization information is provided via the interface 23 and the network 30 to the user device 62 (and/or 63-64) or via the interface 27 and the network 50 to the further user device 72. As a result, the user of the user device 62 (and/or 63-64) may go to the further user device 72 and then order the further personalization information via the link as supplied to the user device 62 (and/or 63-64), by for example sending a link signal via the network 30 and via the interface 23 to the means 22 and the processors 20 and 24. Such a link signal for example results from the dialing of a phone number and/or from the entering of one or more codes and/or from device internal and/or network internal information and may be generated by the user and/or via a connection between both user devices 62 (and/or 63-64) and 72. Or the user or another user may order the further personalization information via the link as supplied to the further user device 72, by for example sending a link signal via the network 50 and via the interface 27 to the means 26 and the processor 24. Such a link signal for example results from the entering of a number and/or from the entering of one or more codes and/or from device internal and/or network internal information and may be generated by the user or the other user. As a result, the further personalization information is pulled towards the further user device 72. The user is for example billed only once for all personalization information together or is for example billed per personalization information. The user for example owns both user devices 62 (and/or 63-64) and 72 or the other user owns the further user device 72 whereby for example a relationship exists between both users. According to this second option, the system 10 only needs to have knowledge about the further user device 72 in case the link is to be sent to this further user device 72, otherwise not.

This way, the user device 62 (and/or 63-64) (fixed/cordless phone) and the further user device 72 (television/set top box) are both provided and personalized with for example mutually dependent and/or related personalization information, such as personalization information related to a same subject or a same theme such as for example the sun (a sunny wallpaper and/or a sunny ring tone for the mobile phone and a sunny wallpaper and/or a sunny computer melody for the pc). Preferably, one and the same user will own both user devices 62 (and/or 63-64) and 72.

Figure 3A:
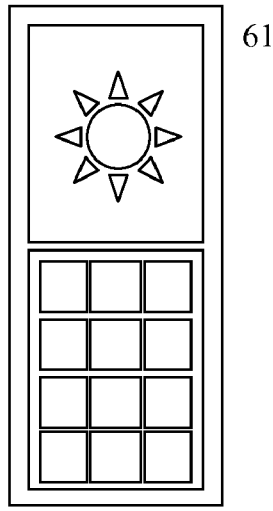
Figure 3B:
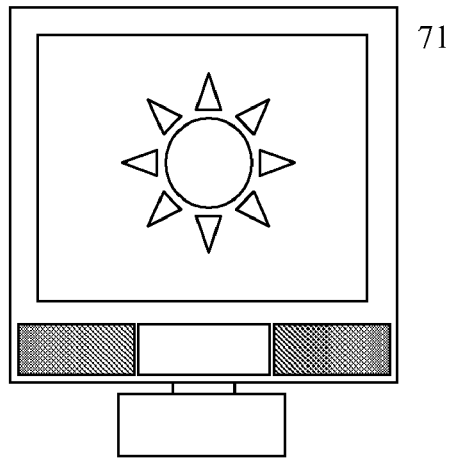
Figure 3C:
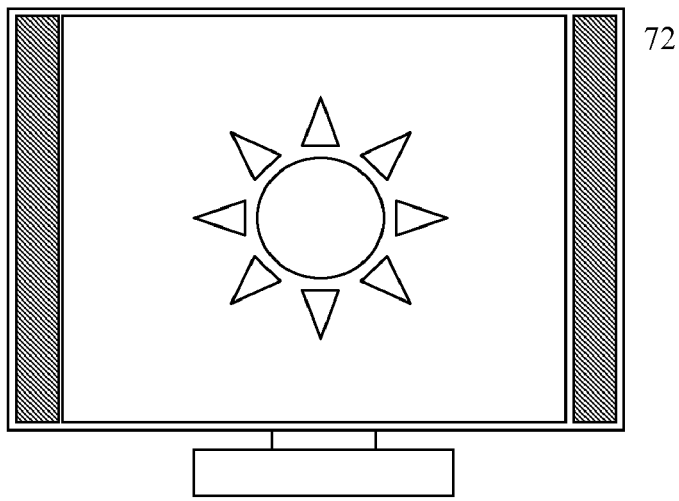

As a result, as shown in FIG. 3A, a user device 61 in the form of a mobile phone has got a sunny wallpaper, as shown in FIG. 3B, a user device 71 in the form of a pc with monitor has got a sunny wallpaper, and as shown in FIG. 3C, a user device 72 in the form of a television has got a sunny wallpaper. Other personalized information is not to be excluded, such as wallpaper related to other subjects or other themes such as football teams, musicians, movies etc. In general, personalized information comprises avatars and/or pictures and/or logos and/or sound and/or speech. The personalization may be used per user or for a small group of related users such as a family or a group of friends or for a larger group of users such as members of a football club.

This way, an application of for example an avatar pack consisting of a set of basic elements such as sounds, images, mood flavours and/or clips may be applied on a per user basis across devices, applications and networks in one or more of the communication applications subscribed by a user. An avatar pack selected by a user is applied for populating the applications in use by this user through a single entity that additionally may provide and maintain the avatar packs but that also may be an intermediate between a provider of avatars and the applications to be managed. The avatar pack comprises all components for populating a user specific representation of this user in each of the communication applications. The user selects or provides an avatar pack including several avatars (multimedia based, static picture, static pictures which represent mood, even with logo, text, sound, speech, nick name, telephone number). For example in case an end-user is a supporter of football club, the end-user can buy from a telecommunications provider a multimedia avatar pack with this football club as a theme. Once the user has bought this pack, the application running at the operator will populate following third party and operator-managed applications: In case the user uses a third party IM application such as a messenger application or a search machine provider application then automatically the application will upload this IM-application with a new avatar ("picture of the football club's complete team"). If the end user uses an IM application which is under control of the operator then exactly the same will happen. If the end user is subscribed to AmigoTV than the application will upload to AmigoTV for instance images representing mood states of one or more players of this football team. If the end user is subscribed to the 3G mobile network then a multimedia clip of five seconds (the captain who receives the Champions League Cup) is uploaded to the network. So from that on, each person that is being called by this end user will receive as a multimedia ring tone this clip of the football club. Many more applications can make use of this avatar pack. An additional advantage may be that all avatars are centred around one specific theme. If the user, some months later, wants to represent himself as a specific car-lover then this is very simple. He buys a new pack and automatically all involved applications are being updated with pictures and clips related to this specific car. The operator can provide universal avatar capability with different options, e.g. the basic avatars and the associated avatars, a user can define different avatars to be used for different scenarios, e.g. during work, after work, with friends, with family, the choice of avatar type can be time dependent or event dependent, or network dependent, e.g. even in PSTN, a telephone number can be displayed as a part of an avatar pack.

All avatars can be centrally stored in the network with an avatar application server (AAS), or in a federated mode, which means that a part of the avatar database can be in one network (3G mobile), another part in another network (IPTV), or geographically distributed, but logically they may be a single avatar database. As an end user, he/she only needs to subscribe once, be it via mobile or IPTV or by other means. The AAS will interact with all different network elements like softswitch, IPTV application server, HSS (Home Subscriber Server), messenger application, search machine provider application, ICQ server etc. The AAS will be triggered by the above mentioned application servers. The choice which avatar from a user's avatar-pack may be dependent on the type or time and other parameters of applications defined in the AAS. The parameters are carried by the interface between AAS and above mentioned application servers. Physically, the AAS can be distributed over a few servers in the network, i.e. the AAS can work in a federated mode. To speed up the downloading and uploading of an avatar-pack, a copy of an avatar from the pack can be stored in local network element e.g. softswitch, or proxy server, in such case, synchronization between central AAS and local avatar data needed. The provisioning (create, modify, add, delete etc.) of an avatar-pack content can be done by the end user via the web, or by an operator via a management interface. The charging of an avatar-pack (subscription, modification, etc.) will be done via a charging interface. A roaming function may be performed using authenticating user id and password.

The advantage of the embodiment shown in FIG. 2 compared to the embodiment shown in FIG. 1 is that in FIG. 2 the system 10 may be distributed for example across a country by locating the means 11 and 12 in a first city and by locating the means 13 and 14 in a second city different from the first city. This way, a federated system or a federation is created with respect to for example avatars. This will improve the selling of new services, preferably in concentrated ways and/or in positioned ways.

In FIGS. 1 and 2, each coupling/connection may be a wired coupling/connection or a wireless coupling/connection. Any unit shown may be divided into sub-units, and any two or more units may be integrated into a new and larger unit (especially but not exclusively the processors 20 and 24 may be advantageously integrated and the means 22 and 26 may be advantageously integrated and the means 21 and 25 may be advantageously integrated and the means 12 and 22 and the interface 23 may be advantageously integrated and the means 14 and 26 and the interface 27 may be advantageously integrated). Any unit shown may comprise hardware and/or software. The computer program product according to the invention may be stored on and/or comprise a fixed medium not shown or a removable medium not shown.

The first means 11 for storing personalization information destined for a user device 61-64 of a predefined type and the third means 13 for storing further personalization information destined for a further user device 71-72 of a further predefined type may store this information all the time or may store this information only temporarily. In the latter case, these means 11 and 13 have some kind of buffering function, whereby other means not shown may store the information for a longer period of time and whereby yet other means not shown may provide the information to the means 11 and 13 whenever necessary etc.

The expression "for" in for example "for storing" and "for providing" etc. does not exclude that other functions are performed as well, simultaneously or not. The expressions "X coupled to Y" and "a coupling between X and Y" and "coupling/couples X and Y" etc. do not exclude that an element Z is in between X and Y. The expressions "P comprises Q" and "P comprising Q" etc. do not exclude that an element R is comprised/included as well. The terms "a" and "an" do not exclude a possible presence of one or more pluralities.

The steps and/or functions of storing and providing do not exclude further steps and/or functions, like for example, inter alia, the steps and/or functions described for the Figures etc.

The invention claimed is:

1. A system for storing and providing information for personalizing user devices, the system comprising:
a first storage module that is operative to store personalization information destined for a first user device of a first predefined user device type;
a first interface that is connected to a first communication channel of a first communication channel type and is operative to provide the personalization information to the first user device via the first communication channel;
a second storage module that is operative to store the personalization information destined for a second user device of a second predefined user device type; and
a second interface that is connected to a second communication channel of a second communication channel type and is operative to provide the personalization information to the second user device of the second predefined type, wherein the first user device and the second user device are different user devices of a same user and the first predefined type and the second predefined type are different predefined user device types and wherein the personalized information destined for the first user device and the personalized information destined for the second user device are different types.

2. The system of claim 1, wherein:
the first user device of the first predefined type comprises a first transceiver that is operative to receive first signals via the first communication channel; and
the second user device of the second predefined type comprises a second transceiver that is operative to receive second signals via the second communication channel, wherein the first communication channel and the second communication channel are different kinds of communication channels.

3. The system of claim 1, further comprising:
a billing module that is operative to bill the user for providing the personalization information,
wherein the same user owns both the first user device and the second user device.

4. The system of claim 1, wherein:
the first user device comprises a mobile phone and/or a cordless phone and/or a fixed phone; and
the second user device comprises a television and/or a set top box and/or a cordless phone or a fixed phone.

5. The system of claim 1, wherein the personalization information destined for the first user device and the personalized information destined for the second user device are derived from a common set of personalized information stored for the user that comprises two or more avatars, pictures, logos, sounds, or videos.

6. The system of claim 1, further comprising an indicator that is operative to indicate that the first user device and the second user device are different user devices of a same user.

7. The system of claim 1, wherein the first and second storage modules reside on one or more network servers.

8. The system of claim 1, further comprising a billing module that is operative to bill the user per personalization information, wherein the same user owns both the first user device and the second user device.

9. The system of claim 1, further comprising an indicator stored in a processor memory that is operative to provide a plurality of indications, including the user of the first device and/or the first device and/or the second user device and/or a relationship between two or more of these indications.

10. A method of storing and providing information for personalizing user devices, the method comprising: a storing personalization information destined for a first user device of a first predefined user device type; providing the personalization information to the first user device via a first communication channel of a first communication channel type; storing the personalization information destined for a second user device of a second predefined user device type; and providing the personalization information to the second user device via a second communication channel of a second communication channel type, wherein the first and second user devices are different user devices of a same user, the first and second predefined user device types are different predefined user device types and wherein the personalized information destined for the first user device and the personalized information destined for the second user device are different types.

11. The method of claim 10, wherein:
the first user device of the first predefined type comprises a first transceiver that is operative to receive first signals via the first communication channel; and
the second user device of the second predefined type comprises a second transceiver that is operative to receive second signals via the second communication channel.

12. The method of claim 10, further comprising:
billing the user for providing the personalization information via a billing module, wherein the user owns both the first user device and the second user device.

13. The method of claim 10, wherein:
the first user device comprises a mobile phone and/or a cordless phone and/or a fixed phone; and
the second user device comprises a television and/or a set top box and/or a cordless phone or a fixed phone.

14. The method of claim 10, wherein the personalization information destined for the first user device and the personalized information destined for the second user device are derived from a common set of personalized information stored for the user that comprises two or more avatars, pictures, logos, sounds, or videos.

15. The method of claim 10, wherein the first communication channel and the second communication channel are different kinds of communication channels.

16. The method of claim 10, further comprising providing an indication that the first user device and the second user device are different user devices of a same user.

17. The method of claim 10, wherein the first and second storage modules reside on one or more network servers.

18. A non-transitory computer-usable data carrier storing instructions that, when executed by a computer, cause the computer to implement a method of storing and providing information for personalizing user devices, the method comprising: storing personalization information destined for a first user device of a first predefined user device type; providing the personalization information to the first user device via a first communication channel of a first communication channel type; storing the personalization information destined for a second user device of a second predefined user device type; and providing the personalization information to the second user device via a second communication channel of a second communication channel type, wherein the first and second user devices are different user device of a same user, the first and second predefined user device types are different predefined user device types, and the first and second communication channel types are different communication channel types and wherein the personalized information destined for the first user device and the personalized information destined for the second user device are different types.

19. The non-transitory computer-usable data carrier of claim 18, wherein the method further comprises:
billing the user for providing the personalization information via a billing module,
wherein the user owns both the first user device and the second user device.

20. The non-transitory computer-usable data carrier of claim 18, wherein:
the first user device comprises a mobile phone and/or a cordless phone and/or a fixed phone; and
the second user device comprises a television and/or a set top box and/or a cordless phone or a fixed phone.

21. The non-transitory computer-usable data carrier of claim 18, wherein the personalization information destined for the first user device and the personalized information destined for the second user device are derived from a common set of personalization information stored for the user that comprises two or more avatars, pictures, logos, sounds, or videos.

22. The non-transitory computer-usable data carrier of claim 18, wherein the first communication channel and the second communication channel are different kinds of communication channels.

23. The non-transitory computer-usable data carrier of claim 18, wherein the method further comprises providing an indication that the first user device and the second user device are different user devices of a same user.

* * * * *